(12) United States Patent
Tian et al.

(10) Patent No.: US 11,831,189 B2
(45) Date of Patent: Nov. 28, 2023

(54) BATTERY QUICK-CHANGE DEVICE OF PORTABLE POWER STATION

(71) Applicant: Shanghai Runhood Power Co., Ltd., Shanghai (CN)

(72) Inventors: Jinfeng Tian, Shanghai (CN); Wei Qin, Shanghai (CN)

(73) Assignee: SHANGHAI RUNHOOD POWER CO., LTD., Shanghai (CN)

(*) Notice: Subject to any disclaimer, the term of this patent is extended or adjusted under 35 U.S.C. 154(b) by 74 days.

(21) Appl. No.: 17/191,696

(22) Filed: Mar. 3, 2021

(65) Prior Publication Data

US 2022/0181892 A1  Jun. 9, 2022

(30) Foreign Application Priority Data

Dec. 9, 2020 (CN) .......................... 202011451311.1
Dec. 15, 2020 (CN) .......................... 202023027094.1

(51) Int. Cl.
 *H02J 7/00* (2006.01)
(52) U.S. Cl.
 CPC .......... *H02J 7/0045* (2013.01); *H02J 7/0013* (2013.01); *H02J 7/0048* (2020.01)
(58) Field of Classification Search
 CPC .................................................. H02J 7/0045
 See application file for complete search history.

(56) References Cited

U.S. PATENT DOCUMENTS 3,947,743 A * 3/1976 Mabuchi ............... H02J 7/0071
 320/128
3,959,706 A * 5/1976 Mabuchi ............... H02J 7/0042
 320/134

(Continued)

FOREIGN PATENT DOCUMENTS

CN 101488671 A 7/2009
CN 203014411 U 6/2013

(Continued)

OTHER PUBLICATIONS

Shenwan Energy Technologies (Zhoushan) Co., Ltd., DE First Office Action, DE102021106669.7, dated Aug. 9, 2021, 7 pgs.

(Continued)

*Primary Examiner* — Drew A Dunn
*Assistant Examiner* — Tynese V McDaniel

(57) ABSTRACT

A battery quick-change device of a portable power station includes a power station housing and several detachable batteries; the power station housing has several battery compartments for accommodating the several detachable batteries; each of the several battery compartments is provided with a compartment opening and a first connector located in a respective battery compartment; each of the several detachable batteries is provided with a second connector capable of being inserted into the first connector; each of the several detachable batteries is assembled into a respective battery compartment through the compartment opening, and the second connector is inserted into the first connector; and the several detachable batteries when assembled into the several battery compartments are electrically connected in parallel.

17 Claims, 7 Drawing Sheets

(56) References Cited

U.S. PATENT DOCUMENTS

| | | | | |
|---|---|---|---|---|
| 4,205,121 A * | 5/1980 | Naitoh | H01M 50/20 | 429/99 |
| 4,724,189 A * | 2/1988 | Chase | H01M 50/213 | 429/99 |
| 5,396,162 A * | 3/1995 | Brilmyer | H01M 10/46 | 320/134 |
| 5,436,089 A | 7/1995 | Fedele | | |
| 5,904,251 A * | 5/1999 | Ogata | B65D 81/05 | 206/386 |
| 6,438,229 B1 * | 8/2002 | Overy | H02J 7/0044 | 379/446 |
| 7,688,027 B2 * | 3/2010 | Kaji | H02J 7/0013 | 320/112 |
| 8,100,723 B2 * | 1/2012 | Vetter | H01M 50/213 | 439/627 |
| 8,181,717 B2 * | 5/2012 | Turner | H01M 50/296 | 439/700 |
| 8,298,696 B1 * | 10/2012 | Dana | H01M 50/267 | 429/96 |
| 8,415,921 B1 * | 4/2013 | Young | B25H 3/02 | 320/112 |
| 9,022,704 B1 * | 5/2015 | Goodman | B23B 5/168 | 408/97 |
| 9,948,118 B1 * | 4/2018 | Patton | H02J 7/0071 | |
| 10,096,996 B1 * | 10/2018 | Lin | H02J 7/1415 | |
| 2004/0017179 A1 * | 1/2004 | Wu | H01R 11/288 | 439/764 |
| 2005/0156560 A1 * | 7/2005 | Shimaoka | H02J 50/80 | 320/107 |
| 2007/0254500 A1 * | 11/2007 | Chiang | H01R 4/5066 | 439/71 |
| 2008/0007215 A1 * | 1/2008 | Hsieh | H02J 7/0045 | 320/114 |
| 2008/0252253 A1 * | 10/2008 | Tsai | H02J 7/0045 | 320/106 |
| 2008/0315832 A1 * | 12/2008 | Kondo | H02J 7/0045 | 320/110 |
| 2009/0023481 A1 * | 1/2009 | Foster | H04B 1/3883 | 320/103 |
| 2009/0212738 A1 * | 8/2009 | Coonan | H02J 7/0013 | 320/113 |
| 2009/0212848 A1 * | 8/2009 | Coonan | H02J 7/0013 | 320/127 |
| 2009/0276104 A1 * | 11/2009 | Coonan | H02J 7/0044 | 361/679.02 |
| 2009/0276637 A1 * | 11/2009 | Coonan | H02J 7/0048 | 713/300 |
| 2010/0213892 A1 * | 8/2010 | DeSanctis | H02J 7/0013 | 320/107 |
| 2010/0253518 A1 * | 10/2010 | Hammoud | A47G 29/1214 | 340/569 |
| 2010/0320969 A1 * | 12/2010 | Sakakibara | H01M 50/20 | 429/61 |
| 2011/0062911 A1 * | 3/2011 | Lloyd | H02J 7/0044 | 320/101 |
| 2011/0101794 A1 * | 5/2011 | Schroeder | H01M 50/512 | 320/101 |
| 2011/0127959 A1 * | 6/2011 | McGary | H02J 7/0044 | 320/114 |
| 2011/0260686 A1 * | 10/2011 | Ford | H02J 7/0013 | 307/66 |
| 2012/0043937 A1 * | 2/2012 | Williams | H02J 7/0044 | 320/114 |
| 2012/0169270 A1 | 7/2012 | Cho et al. | | |
| 2013/0077762 A1 * | 3/2013 | Noguchi | G03B 42/04 | 378/189 |
| 2014/0098525 A1 * | 4/2014 | Bennett | H02J 7/00 | 320/135 |
| 2014/0111159 A1 * | 4/2014 | Siminoff | H02J 7/0045 | 320/111 |
| 2015/0056475 A1 * | 2/2015 | Adrian | H01M 10/441 | 429/50 |
| 2015/0123614 A1 * | 5/2015 | Cover | H02J 7/0044 | 320/110 |
| 2015/0137738 A1 * | 5/2015 | Chien | H02J 7/0044 | 320/107 |
| 2015/0145476 A1 * | 5/2015 | Toya | H02J 7/00 | 320/109 |
| 2015/0155724 A1 * | 6/2015 | Han | H01M 8/2475 | 320/101 |
| 2015/0303527 A1 * | 10/2015 | Maxwell | H01M 10/6557 | 429/61 |
| 2015/0303531 A1 * | 10/2015 | Willgert | H01M 10/6557 | 429/50 |
| 2015/0326060 A1 * | 11/2015 | Young | H02J 50/402 | 320/108 |
| 2016/0099575 A1 | 4/2016 | Velderman et al. | | |
| 2017/0256965 A1 * | 9/2017 | Clark | H02J 7/0045 | |
| 2017/0258135 A1 * | 9/2017 | Yerkic-Husejnovic | A24F 40/95 | |
| 2017/0264120 A1 * | 9/2017 | Byrne | H01R 13/73 | |
| 2017/0279170 A1 | 9/2017 | O'Hora | | |
| 2017/0317492 A1 * | 11/2017 | Koebler | H02J 1/108 | |
| 2017/0333318 A1 * | 11/2017 | Jankins | H02J 7/0044 | |
| 2017/0346140 A1 * | 11/2017 | Koebler | H01M 50/574 | |
| 2018/0079319 A1 * | 3/2018 | Etzelsberger | B60L 50/64 | |
| 2018/0102706 A1 * | 4/2018 | Gao | H02J 7/0063 | |
| 2018/0183250 A1 * | 6/2018 | Byrne | H02J 7/0044 | |
| 2018/0359877 A1 * | 12/2018 | Wang | H01M 10/6556 | |
| 2019/0109478 A1 | 4/2019 | Zhu et al. | | |
| 2019/0131797 A1 * | 5/2019 | Chen | H01M 10/46 | |
| 2019/0131808 A1 * | 5/2019 | Chen | H02J 7/0045 | |
| 2019/0173299 A1 * | 6/2019 | Hsieh | H02J 7/0048 | |
| 2019/0245360 A1 * | 8/2019 | Clark | H02J 7/0045 | |
| 2019/0305403 A1 * | 10/2019 | Wang | H01Q 1/243 | |
| 2019/0372182 A1 * | 12/2019 | Takayasu | H01M 50/20 | |
| 2020/0244086 A1 * | 7/2020 | Ho | A45C 5/00 | |
| 2020/0295580 A1 * | 9/2020 | Bishop | H02J 7/0021 | |
| 2020/0335987 A1 * | 10/2020 | Zheng | H02J 7/0044 | |
| 2020/0343748 A1 * | 10/2020 | Ho | H02J 7/00 | |
| 2021/0159554 A1 * | 5/2021 | Rogers | H01M 50/507 | |
| 2021/0351602 A1 * | 11/2021 | Hsu | H02J 50/10 | |
| 2021/0360803 A1 * | 11/2021 | Semon | H05K 5/0017 | |
| 2021/0402885 A1 * | 12/2021 | Boyd | H02J 7/00032 | |
| 2022/0109321 A1 * | 4/2022 | Truettner | H02J 7/0042 | |
| 2022/0166235 A1 * | 5/2022 | Brozek | H02J 7/00038 | |
| 2022/0190610 A1 * | 6/2022 | Fuchs | H01M 50/691 | |

FOREIGN PATENT DOCUMENTS

| | | | |
|---|---|---|---|
| CN | 104167770 A | 11/2014 | |
| CN | 104425852 A | 3/2015 | |
| CN | 204538762 U | 8/2015 | |
| CN | 204541108 U | 8/2015 | |
| CN | 105449731 A | 3/2016 | |
| CN | 205911544 U | 1/2017 | |
| CN | 207542808 U | 6/2018 | |
| CN | 210468848 U | 5/2020 | |
| CN | 111668900 A | 9/2020 | |
| DE | 10123531 A1 | 5/2001 | |
| EP | 3636480 A1 | 4/2020 | |
| JP | 2011055680 A | 3/2011 | |
| JP | 2018033288 A | 3/2018 | |
| KR | 20160069255 A | 6/2016 | |
| WO | WO 2012/132134 A1 | 10/2012 | |
| WO | WO 2019/208217 A1 | 10/2019 | |
| WO | WO 2020/052422 A1 | 3/2020 | |
| WO | WO-2020160657 A1 * | 8/2020 | A47G 29/141 |

OTHER PUBLICATIONS

Shenwan Energy Technologies (Zhoushan) Co., Ltd., UK First Office Action, GB2102926.9, dated Apr. 19, 2021, 4 pgs.

* cited by examiner

BATTERY QUICK-CHANGE DEVICE OF PORTABLE POWER STATION

CROSS REFERENCE TO RELATED APPLICATIONS

The present application claims priority to Chinese patent application No. CN202023027094.1, entitled "BATTERY QUICK-CHANGE DEVICE OF PORTABLE POWER STATION," filed Dec. 15, 2020, and Chinese patent application No. CN202011451311.1, entitled "POWER STATION SYSTEM AND METHOD FOR CONTROLLING SAME," filed Dec. 9, 2020, each of which is incorporated by reference herein in its entirety.

TECHNICAL FIELD

Embodiments of the present disclosure relate to the field of power station technology, in particular to a battery quick-change device of a portable power station.

BACKGROUND

With the rapid development of society and the improvement of people's living standard, at present, people often choose outdoor activities such as camping, self-driving tour and aerial photography as a way of leisure and relaxation. When people are engaged in the outdoor activities, they need to use high-power electrical equipment such as a computer, a television and an electric power tool to further enhance the fun of outdoor tourism activities. At this time, a power station is often used to power the electrical equipment.

The inventor found that, due to a limited storage power of the power station, the situation of an insufficient power and inability to continue supply power happens from time to time, which not only affects the normal use of the electrical equipment, but also easily causes anxiety among users who are worried about the insufficient power.

Therefore, how to ensure the normal use of the electrical equipment, so that people do not need to worry about an anxiety caused by the insufficient power when carrying out the outdoor activities, is particularly important.

SUMMARY

Some embodiments of the present disclosure provide a battery quick-change device of a portable power station, which enables to meet people's demand for a large power through multiple batteries that may be changed quickly when people are engaged in an outdoor activity, effectively relieve a power anxiety of a user and improve a user experience.

The embodiments of the present disclosure provide a battery quick-change device of a portable power station, including: a power station housing and several detachable batteries; wherein the power station housing has several battery compartments for accommodating the several detachable batteries; each of the several battery compartments is provided with a compartment opening and a first connector located in a respective battery compartment; each of the several detachable batteries is provided with a second connector capable of being inserted into the first connector; each of the several detachable batteries is assembled into a respective battery compartment through the compartment opening, and the second connector is inserted into the first connector; and the several detachable batteries assembled into the several battery compartments are electrically connected in parallel.

Compared with existing technologies, the battery compartment according to the embodiment of the present disclosure is provided with the compartment opening and the first connector located in the battery compartment. The detachable battery is provided with a second connector which may be inserted into the first connector. The detachable battery is assembled into the battery compartment through the compartment opening and the second connector is inserted into the first connector. When the power station is out of power, a dead battery is taken out through the compartment opening, and a detachable live battery is assembled into the battery compartment through the compartment opening, and the second connector is inserted into the first connector, which make the power station continue to supply power, so that when carrying out an outdoor activity, people merely need to carry multiple batteries to ensure a normal use of an electrical equipment without worrying about insufficient power. In addition, since the detachable batteries assembled into the several battery compartments are electrically connected in parallel, when one or more detachable battery is taken out, the remaining batteries in other battery compartments may continue to supply power, and the power station may not be interrupted.

In some embodiments, in the battery quick-change device of the portable power station, the power station housing further includes a lock catch arranged on the respective battery compartment, and the lock catch is configured to lock a respective detachable battery in the respective battery compartment tightly when the respective detachable battery is assembled into the respective battery compartment. The respective detachable battery is locked tightly in the battery compartment through the lock catch when the detachable battery is assembled into the respective battery compartment, thus preventing the detachable battery from falling out of the battery compartment when the outdoor power source is moved.

In some embodiments, the battery quick-change device of the portable power station further includes: a detachable protective cover fixed on the power station housing and configured to cover the several compartment openings; and an elastic part arranged on one side of the protective cover covering the several compartment openings and corresponding to the compartment openings. The detachable protective cover fixed on the power station housing and configured to cover the several compartment openings, so as to prevent the detachable batteries from falling out of the battery compartments. The elastic part is arranged on one side of the protective cover covering the several compartment openings and corresponding to the compartment openings, so that under the condition that the power station encounters an extreme impact or a collision that causes a lock catch failure, the battery presses and holds the elastic part so that the elastic part is elastically deformed, thus buffering an inertia force of the battery and preventing the battery from being damaged due to the collision.

In some embodiments, in the battery quick-change device of the portable power station, each of the several battery compartments is provided with a front part and a rear part; each of the several compartment openings is located at the front part, and the first connector is arranged at the rear part.

In some embodiments, in the battery quick-change device of the portable power station, each of the several battery compartments is further provided with a first guide part adjacent to the first connector, and each of the several detachable batteries is provided with a second guide part capable of being fitted with the first guide part; wherein, a length of the first guide part is greater than a length of the first connector in a direction from the rear part to the front part. In the direction from the rear part to the front part, the length of the first guide part is greater than the length of the first connector, so that when the detachable battery is assembled into the battery compartment through the compartment opening, a fitting between the first guide part and the second guide part is prior to an insertion of the first connector and the second connector, which defines a insertion direction when the first connector is inserted into the second connector, and further improves an insertion accuracy of the first connector and the second connector, thus avoiding a damage and life reduction of the first connector and the second connector caused by an insertion error of the first connector and the second connector.

In some embodiments, in the battery quick-change device of the portable power station, the rear part is further provided with a buffer part. The buffer part is pressed and held by a respective detachable battery and elastically deformed when the respective detachable battery is assembled into the respective battery compartment. When the battery is assembled into the battery compartment, the buffer part is pressed and held by the battery and elastically deformed, thus preventing the battery from being damaged by impacting the rear part of the battery compartment during the process of being assembled into the battery compartment.

In some embodiments, in the battery quick-change device of the portable power station, each of the several battery compartments further includes a first fool-proofing mechanism extending from the front part to the rear part, and each of the several detachable batteries is provided with a second fool-proofing mechanism matched with the first fool-proofing mechanism. The battery compartment includes the first fool-proofing mechanism extending from the front part to the rear part, and the battery is provided with the second fool-proofing mechanism matched with the first fool-proofing mechanism, so that the user may avoid an assembly error when assembling the battery into the battery compartment and may correctly assemble the battery into the battery compartment without experience.

In some embodiments, in the battery quick-change device of the portable power station, a charging interface and/or a discharging interface is provided for the several detachable batteries. The charging interface and/or the discharging interface is included, so that the battery may be charged and/or discharged separately.

In some embodiments, the battery quick-change device of the portable power station further includes a charge/discharge control equipment associated with the charging interface and/or the discharging interface, the charge/discharge control equipment including a charge/discharge circuit, a controller and a detection circuit; wherein, the charge/discharge circuit is connected with the several detachable batteries in the several battery compartments respectively; the controller is connected with the charge/discharge circuit and the several detachable batteries; and the detection circuit is connected with the several detachable batteries and the controller for detecting voltage values of the several detachable batteries, and controlling at least some detachable batteries of the several detachable batteries to be connected with the charge/discharge circuit to run according to the voltage values; wherein, the at least some detachable batteries are all batteries among the several detachable batteries with voltage difference not exceeding a preset value.

In some embodiments, the charge control equipment may further include several MOS transistors connected with the several detachable batteries respectively, each of the several detachable batteries is connected with the charge/discharge circuit via a respective MOS transistor, and the charge/discharge circuit is configured to control a connection and disconnection of a respective detachable batteries by controlling a switch of a respective MO S transistor.

In some embodiments, the battery quick-change device of the portable power station may further include a display device for displaying a level of a battery power. The display device for displaying the level of the battery power is included, so that the user may check the current the level of battery power in real time.

In some embodiments, the battery quick-change device of the portable power station further includes a heat radiation fin arranged on the power station housing.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Figure 1:
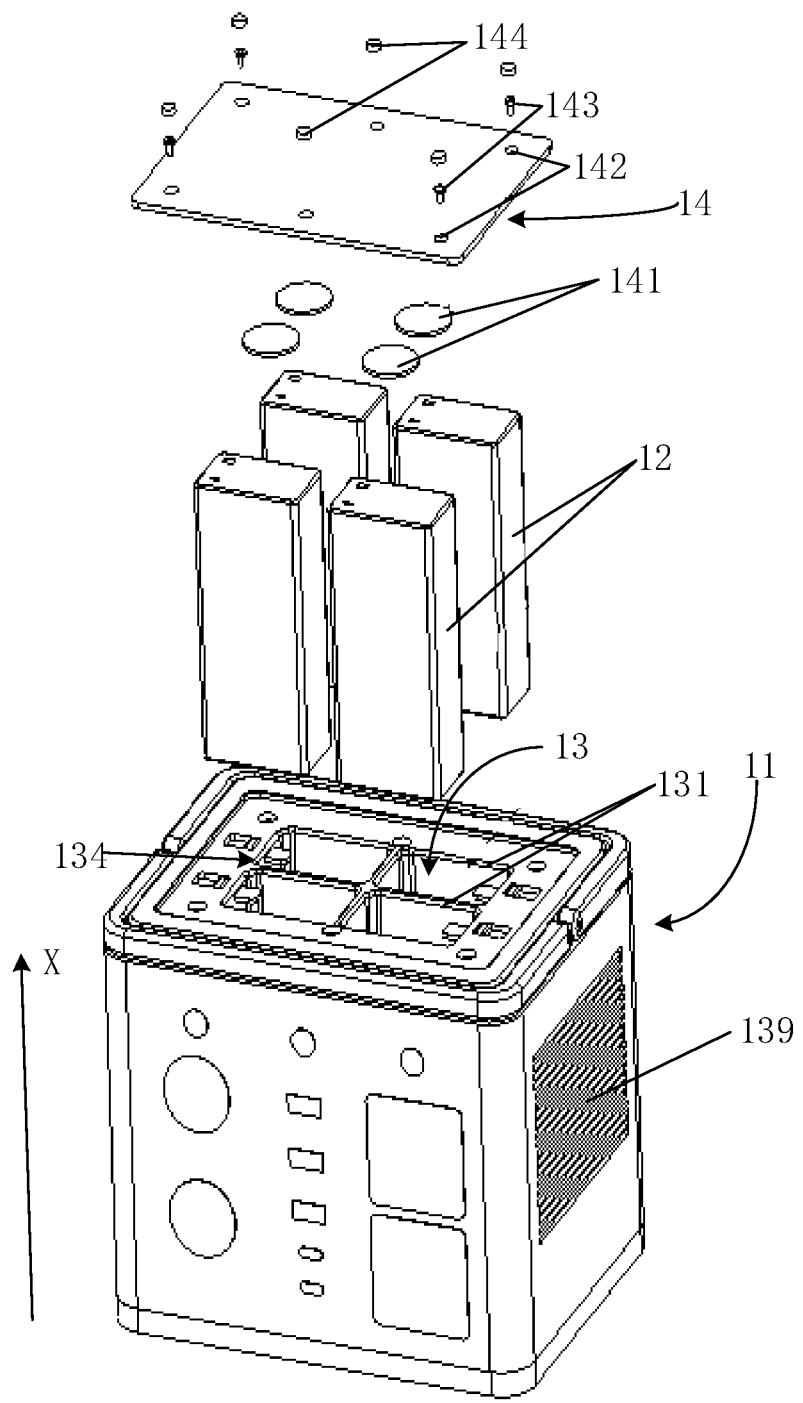
FIG. 1 is an exploded view of a battery quick-change device of a portable power station provided in an embodiment 1 of the present disclosure.
Figure 2:
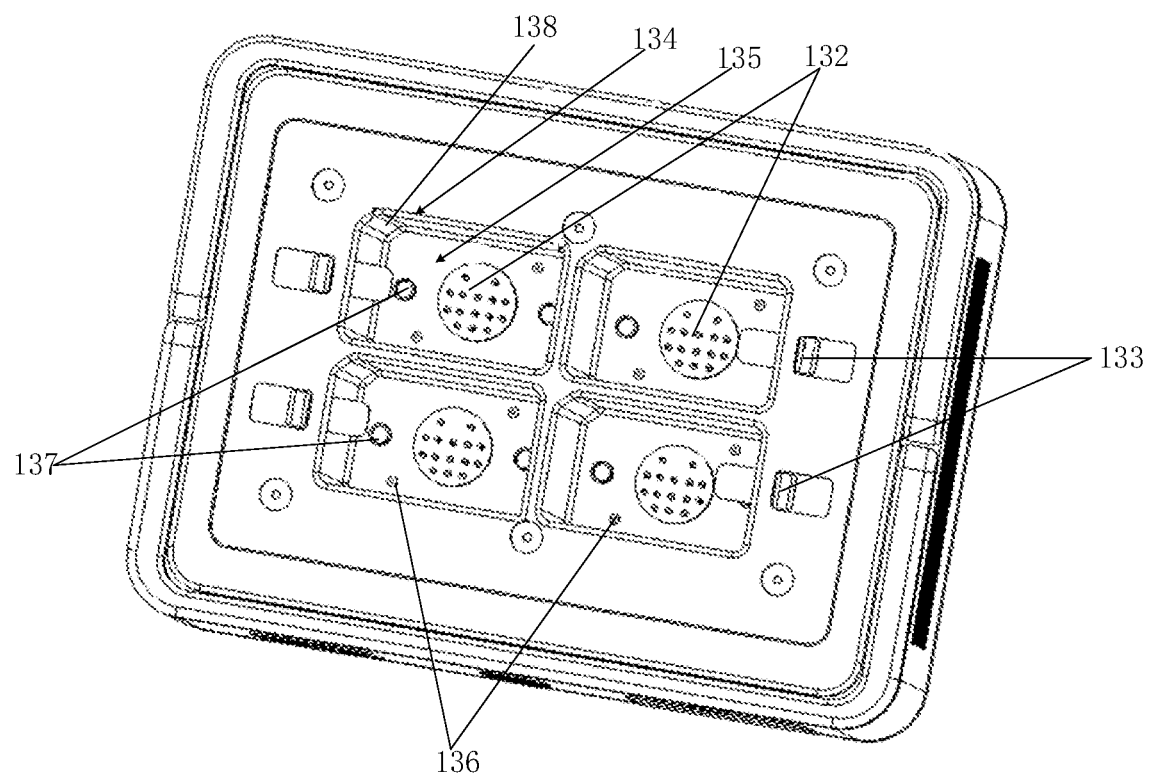
FIG. 2 is a schematic structural diagram of a power station housing provided in an embodiment of the present disclosure.
Figure 3:
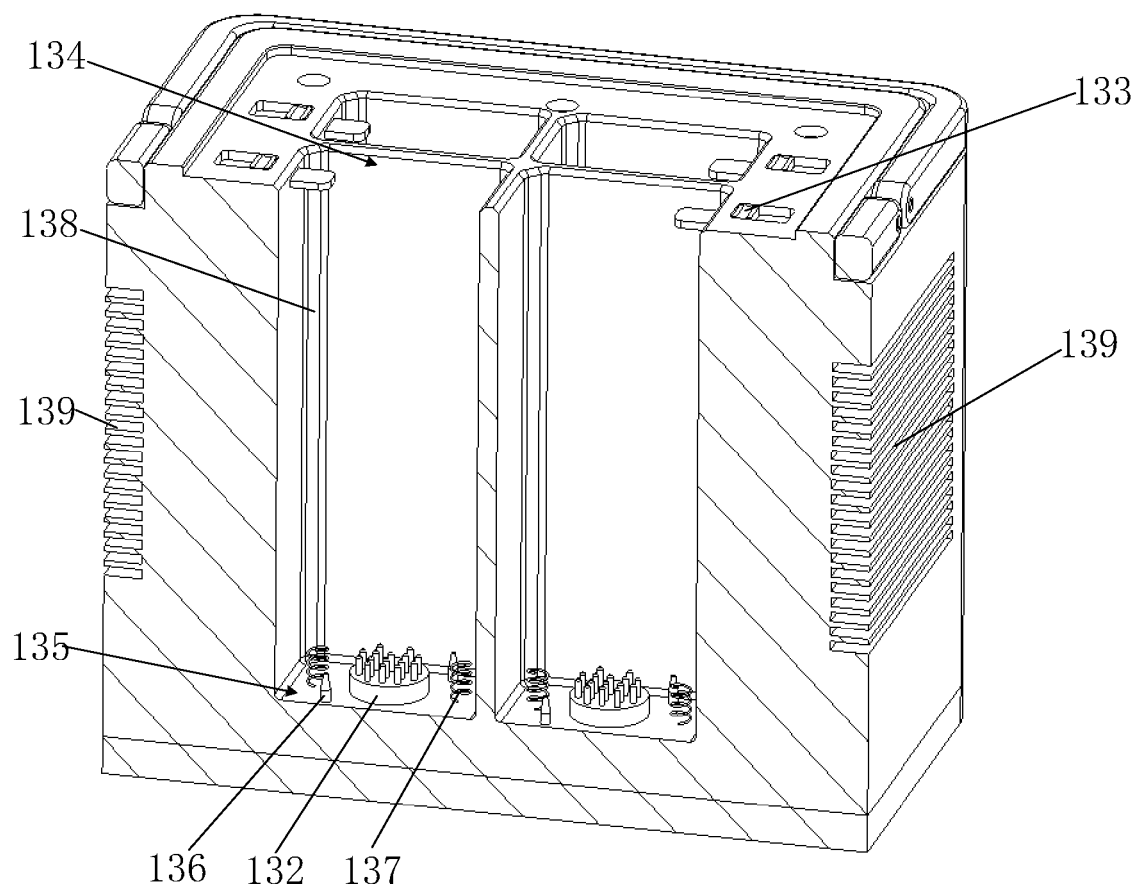
FIG. 3 is a sectional view of the power station housing provided in an embodiment of the present disclosure.
Figure 4:
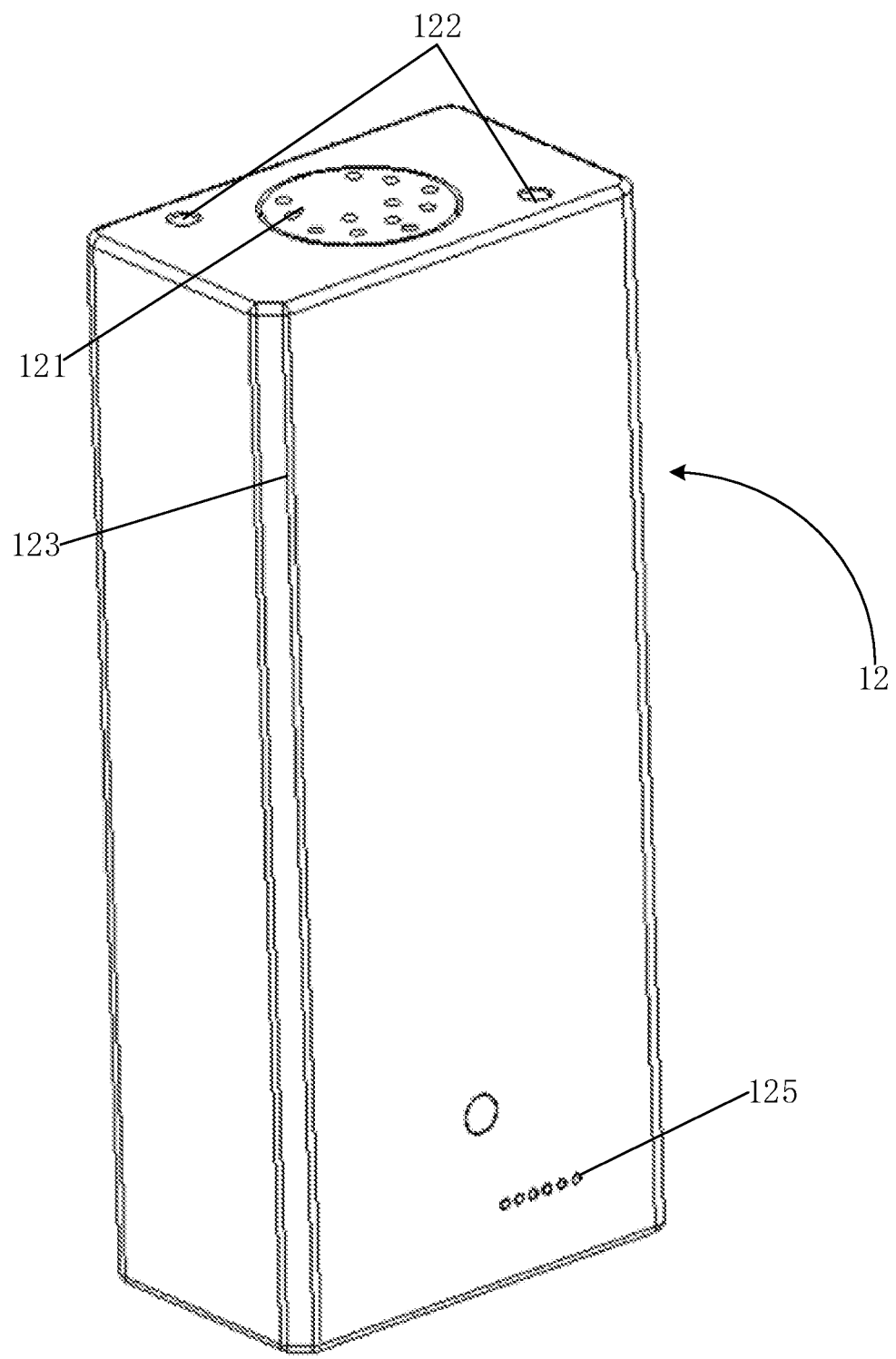
FIG. 4 is a schematic structural diagram of a battery provided in an embodiment of the present disclosure.
Figure 5:
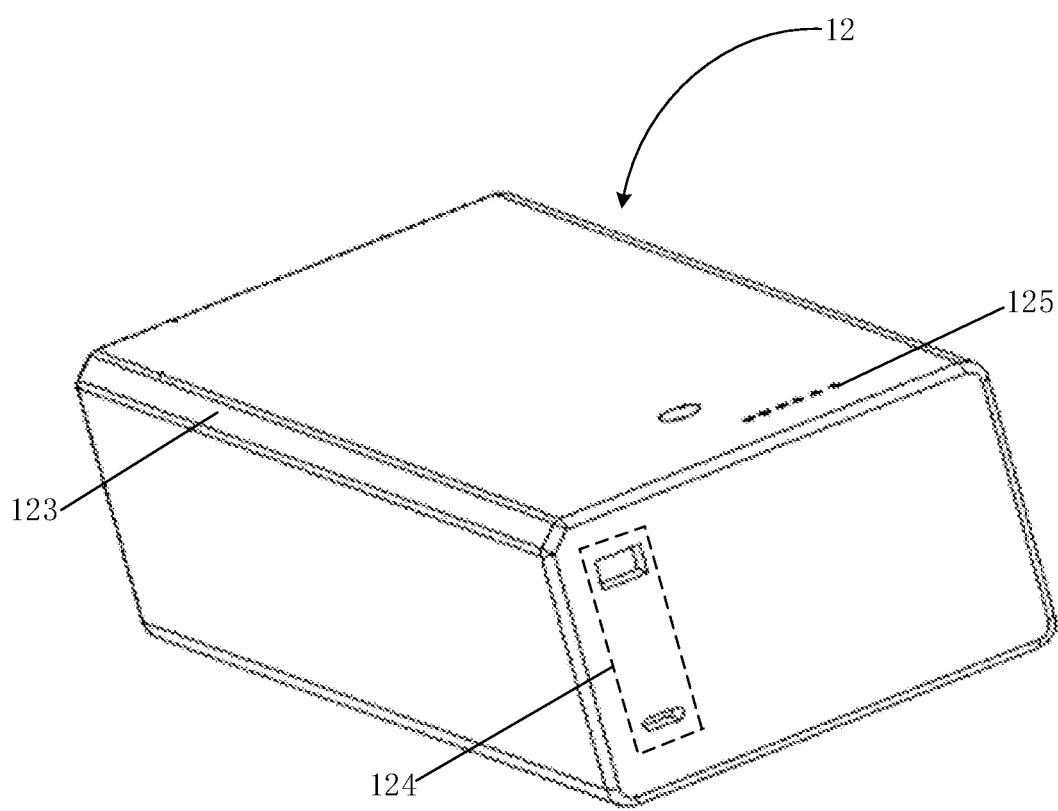
FIG. 5 is a structural schematic diagram of the battery provided in an embodiment of the present disclosure from another perspective.

The embodiments of the present disclosure will be described in detail below with reference to the accompanying drawings in order to make the objectives, technical solutions and advantages of the present disclosure clearer. However, those having ordinary skills in the art can appreciate that, in the various embodiments of the present disclosure, numerous technical details are set forth in order to provide the reader with a better understanding of the present disclosure. However, the technical solutions claimed in the present disclosure may be implemented based on various changes and modifications of the following embodiments.

An embodiment of the present disclosure provides a battery quick-change device of a portable power station. A battery compartment is provided with a compartment opening and a first connector located in the battery compartment. A battery is provided with a second connector which may be inserted into the first connector. A detachable battery is configured to be assembled into the battery compartment through the compartment opening with the second connector inserted into the first connector. When the power station is out of power, a dead battery is taken out through the compartment opening, and a detachable live battery is assembled into the battery compartment through the compartment opening, and the second connector is inserted into the first connector, which make the power station continue to supply power, so that when carrying out an outdoor activity, people merely need to carry multiple batteries to ensure a normal use of an electrical equipment without an anxiety of insufficient power. In addition, since the batteries when assembled into the battery compartments are electrically connected in parallel, when one or more battery is taken out, the batteries in other battery compartments may continue to supply power, and the power station may not be interrupted.

The details of this embodiment will be described in detail below. The following contents are only for convenience of understanding the implementation details provided, and are not essential for implementing this solution.

Referring to FIGS. 1 to 5, the battery quick-change device of the portable power station provided in the embodiment of the present disclosure includes a power station housing 11 and several detachable batteries 12. The power station housing 11 has several battery compartments 13 for accommodating the several batteries 12 respectively. The battery compartment 13 is provided with a compartment opening 131 and a first connector 132 located in the battery compartment 13. The battery 12 is provided with a second connector 121 that may be inserted into the first connector 132. The detachable battery 12 is assembled into the battery compartment 13 through the compartment opening 131, and the second connector 121 is inserted into the first connector 132.

Specifically, in this embodiment, the power station housing 11 is provided with four battery compartments 13 for accommodating the batteries 12. Each battery compartment 13 is provided with one first connector 132, and each battery compartment 13 is used for accommodating one battery 12. The detachable battery 12 is assembled into the battery compartment 13 through the compartment opening 131. The battery 12 is provided with the second connector 121 which may be inserted into the first connector 132. It can be understood that in order to improve an energy density of the battery 12, the battery 12 may be a lithium ion battery. In order to reduce a weight of the power station and improve the convenience of the power station without reducing a battery capacity of the power station, the power station housing 11 is made of a high-strength PC/ABS (PC: polycarbonate; ABS: acrylonitrile butadiene styrene copolymers; PC/ABS: a mixture of the polycarbonate and the acrylonitrile butadiene styrene copolymers) material in addition to a conductive material used for conducting electricity, so as to reduce the weight of the power station while ensuring a structural strength of the power station housing 11. In addition, in this embodiment, the battery 12 is a battery rod. Each battery rod is composed of one cell or multiple cells connected in series/parallel.

It should be noted that in other changeable embodiments, the power station housing may also be provided with other number of the battery compartments. For example, in one embodiment, the power station housing may only be provided with one battery compartment. The one battery compartment may be provided with multiple first connectors, and may accommodate multiple batteries at the same time. It is worth noting that an arrangement direction of the battery compartment may be vertical, horizontal or oblique, etc.

In this embodiment, the four first connectors 132 of the four battery compartments 13 in the power station housing 11 are connected in parallel, so that the four batteries 12 assembled into the four battery compartments 13 are electrically connected in parallel. Therefore, when any battery 12 is taken out, the batteries 12 in the other battery compartments 13 may continue to supply power without interrupting the power station. In addition, the first connector 132 is a male plug and the second connector 121 is a female jack. When the first connector 132 is inserted into the second connector 121, a plug of the first connector 132 is inserted into a jack of the second connector 121, thereby realizing an electrical connection between the battery 12 and the battery compartment 13.

In other alternative embodiments, the first connector may also be the female jack, and the second connector may be the male plug. When the first connector is inserted into the second connector, a plug of the second connector is inserted into a jack of the first connector.

In some embodiments, the power station housing 11 further includes a lock catch 133 arranged at the battery compartment 13. The lock catch 133 locks the battery 12 in the battery compartment 13 when the battery 12 is assembled into the battery compartment 13, thereby preventing the battery 12 from falling out of the battery compartment 13 when the power station is moved.

Specifically, in this embodiment, the lock catch 133 is an elastic reset lock catch, and is arranged at the compartment opening 131 of the battery compartment 13. When the battery 12 is not assembled into the battery compartment 13, the lock catch 133 is in an unlock state. When the battery is assembled into the battery compartment 13, the lock catch 133 is manually locked; so that the lock catch 133 locks the battery 12 in the battery compartment 13 tightly. It can be understood that in other embodiments, the lock catch may be provided with an electromagnetic valve and a sensing device. When the sensing device senses that the battery is provided in the battery compartment, the electromagnetic valve is electrified so that the lock catch locks the battery in the battery compartment tightly. The sensing device may be a distance sensing device, and further, there is no need to manually unlock or lock the lock catch.

Further, the above-described battery quick-change device of the portable power station further includes a detachable protective cover 14 fixed on the power station housing 11 and configured to cover the several compartment openings 131. An elastic part 141 is arranged on one side of the protective cover 14 covering the several compartment openings 131 and corresponding to the compartment openings 131. Under the condition that the power station encounters an extreme impact or a collision that causes a lock catch 133 failure, the battery 12 may press the elastic part 141 so that the elastic part 141 is elastically deformed, thus buffering an inertia force of the battery 12. That is, under a protection of the protective cover 14, a second protection is achieved, and the battery 12 is prevented from being damaged due to the collision.

Specifically, in this embodiment, there are four elastic parts 141. The four elastic parts 141 are arranged on one side of the protective cover 14 which covers the several compartment openings 131 and respectively correspond to the four compartment openings 131. The elastic part 141 is an elastic pad, one side of which is provided with a double-sided adhesive tape, so that it may be adhered to the protective cover 14. Under the condition that the power station encounters the extreme impact or the collision that causes the lock catch 133 failure, the battery 12 presses the elastic part 141 so that the elastic part 141 is elastically deformed, thus buffering the inertia force of the battery 12. That is, under the protection of the protective cover 14, the second protection is achieved, and the battery 12 is prevented from being damaged due to the collision. It should be noted that in other embodiments, there may be only one elastic part. The one elastic part is arranged on one side of the protective cover covering the several compartment openings and covers four compartment openings simultaneously. In addition, it should be noted that in other embodiments, only the lock catch 133 (but without the detachable protective cover) may be provided to prevent the battery 12 from falling out of the battery compartment 13 when the power station is moved.

The protective cover 14 is provided with several through holes 142. Several screws 143 respectively pass through the several through holes 142 to fix the protective cover 14 on the power station housing 11. For aesthetic purposes and to avoid oxidation and rusting of the screw 143 caused by the contact of the screw 143 with the outside, a plug 144 is embedded into the through hole 142 after the screw 143 passes through the through hole 142 to fix the protective cover 14 on the power station housing 11. In addition, when some of the through holes 142 are not provided with the screw 143, the plug 144 may also be directly embedded into the through hole 142. It should be noted that in other embodiments, a quick-release buckle for fixing the protective cover on the power station housing may also be provided, so that no screw is required to fix the protective cover on the power station housing.

In some embodiments, the battery compartment 13 is provided with a front part 134 and a rear part 135. The compartment opening 131 is located at the front part 134, and the first connector 132 is arranged at the rear part 135. The battery compartment 13 is further provided with a first guide part 136 adjacent to the first connector 132, and the battery 12 is provided with a second guide part 122 that may be fitted with the first guide part 136. In a direction from the rear part 135 to the front part 134 (i.e., the X direction in the figure), a length of the first guide part 136 is greater than a length of the first connector 132, so that when the detachable battery 12 is assembled into the battery compartment 13 through the compartment opening 131, a fitting between the first guide part 136 and the second guide part 122 is prior to an insertion of the first connector 132 and the second connector 121, which limits a insertion direction when the first connector 132 is inserted into the second connector 121, and further improves an insertion accuracy of the first connector 132 and the second connector 121, thus avoiding a damage and life reduction of the first connector 132 and the second connector 121 caused by an insertion error of the first connector 132 and the second connector 121. In this embodiment, the direction from the front part 134 to the rear part 135 is a gravity direction.

Specifically, in this embodiment, the first guide part 136 is a guide pin and the second guide part 122 is a guide hole. When the first guide part 136 is fitted with the second guide part 122, the guide pin is inserted into the guide hole. In the direction from the rear part 135 to the front part 134, the length of the first guide part 136 is not greater than the length of the second guide part 122. In other alternative embodiments, the first guide part is a guide hole, and the second guide part is a guide pin. In the direction from the rear part to the front part, the length of the second guide part is not greater than the length of the first guide part.

Further, the rear part 135 is further provided with a buffer part 137. The buffer part 137 is pressed by the battery 12 and elastically deformed when the battery 12 is assembled into the battery compartment 13, thereby preventing the battery 12 from being bumped during assembling into the battery compartment 13 due to gravity, resulting in damage to the battery 12.

Specifically, in this embodiment, the buffer part 137 is a buffer spring. Each battery compartment 13 is provided with two buffer parts 137, and the first connector 132 is arranged between the two buffer parts 137, thereby preventing the battery 12 from being damaged by a mechanical impact caused by gravity.

Furthermore, the battery compartment 13 further includes a first fool-proofing mechanism 138 extending from the front part 134 to the rear part 135, and the battery 12 is provided with a second fool-proofing mechanism 123 fitted with the first fool-proofing mechanism 138, so that the user may avoid an assembly error when assembling the battery 12 into the battery compartment 13 and may correctly assemble it without experience.

Specifically, in this embodiment, the first fool-proofing mechanism 138 is a notch of the battery compartment 13 extending from the front part 134 to the rear part 135, and the second fool-proofing mechanism 123 is a side wall of the battery 12 that is fitted with the notch, so that a cavity of the battery compartment 13 for accommodating the battery 12 has the same size and shape as a cross section of the battery 12 extending from the front part 134 to the rear part 135.

In some embodiments, the battery 12 is further provided with a charging interface and a discharging interface, so that the battery 12 may be charged and discharged separately.

Specifically, the battery 12 is provided with a USB (USB: Universal Serial Bus) charging/discharging interface 124 having both charging and discharging functions. In this embodiment, the USB charging/discharging interface 124 includes a Type-A interface (a link joint of the USB interface) and a Type-C interface (a link joint of the USB interface).

Furthermore, the battery 12 is also provided with a display device 125 for displaying a power of the battery 12, so that the user may check the current power of the battery in real time. In addition, the above-described battery quick-change device of the portable power station further includes a heat radiation fin 139 arranged on the power station housing 11 to improve a heat radiation effect of the power station during the use of the power station.

Figure 6:
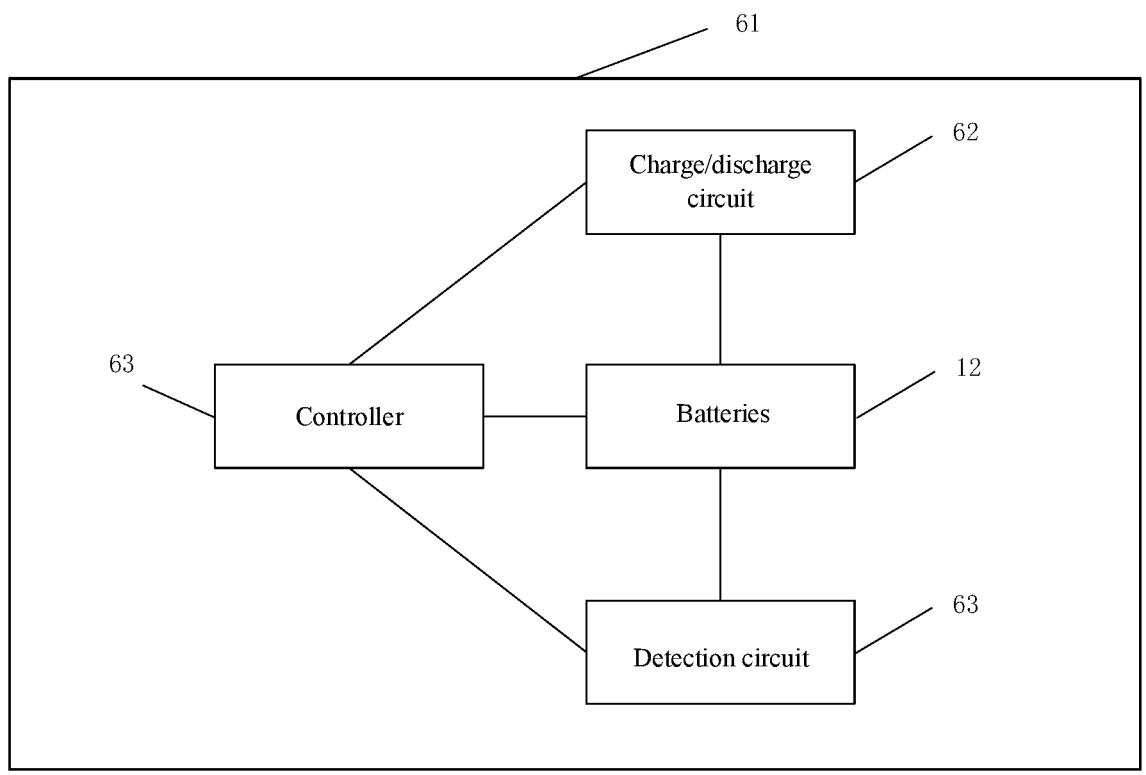
FIG. 6 is a structural block diagram of charge/discharge control equipment provided in an embodiment of the present disclosure.

In other embodiments, the above-described battery quick-change device of the portable power station further includes a charge/discharge control equipment 61 associated with the charging/discharging interface 124. Referring to FIG. 6, the equipment 61 includes a charge/discharge circuit 62, a controller 63 and a detection circuit 64. Herein, the charge/discharge circuit 62 is connected with multiple batteries 12 in the battery compartment 13. The controller 63 is connected with the charge/discharge circuit 62 and the multiple batteries 12. The detection circuit 64 is connected with the multiple batteries 12 for detecting a voltage value in the multiple batteries 12 and the controller 63 for controlling at least some batteries in the multiple batteries 12 to be connected with the charge/discharge circuit 62 to run in parallel according to the voltage value. Herein, the at least some batteries are all batteries among the multiple batteries whose voltage difference does not exceed a preset value, so that charging and discharging with a higher power may be realized on the premise of ensuring that the voltage difference between the batteries connected with the charge/discharge circuit 62 does not exceed the preset value, thereby avoiding the problem of backflow between the batteries caused by the voltage difference between the batteries, reducing a damage rate of a power station system and prolonging a service life of a battery system.

In some embodiments, the detection circuit 64 is also configured to detect a charging/discharging state of the battery. When it is detected that the battery is in a charging state, the detection circuit 64 is also configured to determine that a battery with a lowest voltage among the multiple batteries 12 is a first battery; and to determine that a battery among the multiple batteries 12 whose voltage difference with the first battery exceeds a preset value is a second battery. The controller 63 is configured to control the second battery to be disconnected from the charge/discharge circuit 62, and to control the remaining batteries of the multiple batteries 12 to remain connected with the charge/discharge circuit 62. By controlling the battery with the lowest voltage and the battery whose voltage difference with the battery with the lowest voltage does not exceed the preset value to be connected with the charge/discharge circuit 62 in the charging state, a voltage value of the battery with a relatively low voltage may be continuously increased during the continuously charging process, and a voltage difference between all the batteries may be continuously reduced.

In some embodiments, the detection circuit 64 is also configured to re-detect the current voltage values of the first battery and the second battery during the process of continuously charging to reduce the voltage difference of all the batteries. When the voltage difference between the disconnected second battery and the first battery does not exceed the preset value, the disconnected second battery is reconnected to increase the battery number running in parallel in the power station system and to realize the charging of the second battery. Optionally, there is one or more second battery. When there are multiple second batteries, the above steps are repeated until all the current batteries in the power station system are connected to the charge/discharge circuit 62.

In some embodiments, when the detection circuit 64 detects that the battery is in a discharging state or a resting state, the detection circuit 64 is also configured to determine a battery with a highest voltage among the multiple batteries 12 as a first battery, determine a battery whose voltage difference with the first battery exceeds a preset value as a second battery, control the second battery to be disconnected from the charge/discharge circuit 62, and control the remaining batteries of the multiple batteries 12 to remain connected with the charge/discharge circuit 62. By controlling the battery with the highest voltage and the battery whose voltage difference with the battery with the highest voltage does not exceed the preset value to be connected with the charge/discharge circuit 62 in the discharging state or the resting state, a voltage value of the battery with a relatively high voltage may be continuously decreased during the continuously discharging process, and the voltage difference between all the batteries may be continuously reduced.

In some embodiments, the detection circuit 64 is also configured to re-detect the current voltage values of the first battery and the second battery during the process of continuously discharging to reduce the voltage difference of all the batteries. When the voltage difference between the disconnected second battery and the first battery does not exceed the preset value, the disconnected second battery is reconnected to increase the battery number running in parallel in the power station system and to realize the charging of the second battery. Optionally, there is one or more second battery. When there are multiple second batteries, the above steps are repeated until all the current batteries in the power station system are connected to the charge/discharge circuit 62.

By constantly re-detecting the current voltage values of the batteries, and continuously connecting the disconnected battery whose voltage difference with the battery with the lowest voltage does not exceed the preset value in the charging process, or continuously connecting the disconnected battery whose voltage difference with the battery with the highest voltage does not exceed the preset value in the discharging process, all the current batteries 12 in the power station system are finally connected with the charge/discharge circuit 62 on the premise that the voltage difference does not exceed the preset value, thus realizing a maximum power charging or discharging.

Figure 7:
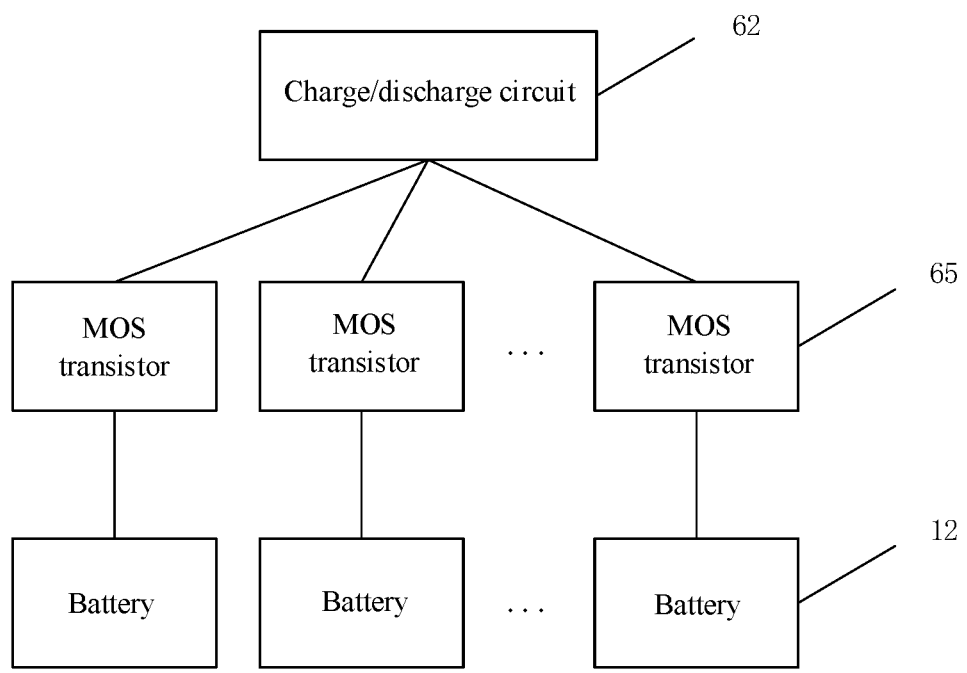
FIG. 7 is a schematic diagram of a battery connection of the charge control equipment provided in an embodiment of the present disclosure.

In some embodiments, referring to FIG. 7, the charge control equipment 61 may further include a MOS transistor 65 correspondingly connected with each battery of the multiple batteries 12. Each battery of the multiple batteries 12 is connected with the charge/discharge circuit 62 via the MOS transistor 65. The charge/discharge circuit 62 controls a connection and disconnection of the battery 12 by controlling a switch of the MOS transistor 65. Specifically, each battery is connected with a charging MOS transistor and a discharging MOS transistor. A charge path of the battery is electrically conductive by controlling the turn-on of a charging MOS transistor, and the discharge path of the battery is electrically conductive by controlling the turn-on of a discharging MOS transistor.

Those having ordinary skill in the art can appreciate that the aforementioned embodiments are specific embodiments for implementing the present disclosure. In practice, however, various changes may be made in the forms and details of the specific embodiments without departing from the spirit and scope of the present disclosure. Any person skilled in the art can make their own changes and modifications without departing from the spirit and scope of the present disclosure. Therefore, the protection scope of the present disclosure shall be subject to the scope defined by the claims.

What is claimed is:

1. A battery quick-change device, which is used for a portable power station, comprising: a power station housing and several detachable batteries; wherein,
    the power station housing has several battery compartments for accommodating the several detachable batteries respectively;
    each respective battery compartment of the several battery compartments is provided with a respective compartment opening and a respective first connector located in the respective battery compartment;
    each of the several detachable batteries is provided with a second connector capable of being inserted into the first connector in a corresponding battery compartment;
    the each of the several detachable batteries is configured to be assembled into the corresponding battery compartment through the compartment opening of the corresponding battery compartment, with the second connector inserted into the first connector in the corresponding battery compartment; and
    the first connectors in respective ones of the several battery compartments are connected to each other in parallel such that the several detachable batteries are electrically connected in parallel when respectively assembled into the several battery compartments,
    wherein the battery quick-change device further comprises:

a detachable protective cover configured to cover the several compartment openings;

several elastic parts; wherein each of the several elastic parts respectively corresponds to a respective compartment opening of the several compartment openings and includes a respective elastic pad, one side of the respective elastic pad being provided with a double-sided adhesive tape so that the respective elastic pad is adapted to adhere to the detachable protective cover; and several screws, wherein the detachable protective cover is provided with several through holes, and each of the several screws passes through a respective through hole of the several through holes to attach the detachable protective cover on the power station housing.

2. The battery quick-change device according to claim 1, wherein the power station housing further comprises a lock catch arranged on the respective battery compartment, and the lock catch is configured to lock a respective detachable battery in the respective battery compartment when the respective detachable battery is assembled into the respective battery compartment.

3. The battery quick-change device according to claim 2, wherein the lock catch includes an elastic reset lock catch and is arranged at the compartment opening of the respective battery compartment.

4. The battery quick-change device according to claim 2, wherein the lock catch is in an unlock state when each of the several detachable batteries is not assembled into the respective battery compartment, and the lock catch is manually locked when each of the several detachable batteries have been assembled into the respective battery compartment.

5. The battery quick-change device according to claim 2, wherein the lock catch is provided with an electromagnetic valve and a sensing device, and wherein the electromagnetic valve is electrified to make the lock catch lock the respective detachable battery in the respective battery compartment in response to the sensing device sensing that the respective detachable battery is provided in the respective battery compartment.

6. The battery quick-change device according to claim 1, further comprising:

a detachable protective cover fixed on the power station housing and configured to cover the several compartment openings; and an elastic part arranged on one side of the protective cover covering the several compartment openings and corresponding to the compartment openings.

7. The battery quick-change device according to claim 1, wherein each respective battery compartment of the several battery compartments is provided with a front part and a rear part; each respective battery compartment of the several compartment openings is located at the front part, and the first connector is arranged at the rear part.

8. The battery quick-change device according to claim 7, wherein each respective battery compartment of the several battery compartments is further provided with a first guide part adjacent to the first connector, and each of the several detachable batteries is provided with a second guide part capable of being fitted with the first guide part; wherein, a length of the first guide part is greater than a length of the first connector in a direction from the rear part to the front part.

9. The battery quick-change device according to claim 7, wherein the rear part is further provided with a buffer part, and the buffer part is pressed by a respective detachable battery and elastically deformed when the respective detachable battery is assembled into the respective battery compartment.

10. The battery quick-change device according to claim 7, wherein each respective battery compartment of the several battery compartments further comprises a first fool-proofing mechanism extending from the front part to the rear part, and each of the several detachable batteries is provided with a second fool-proofing mechanism matched with the first fool-proofing mechanism.

11. The battery quick-change device according to claim 1, wherein a charging interface and/or a discharging interface is provided for the several detachable batteries.

12. The battery quick-change device according to claim 11, further comprising a charge/discharge control equipment associated with the charging interface and/or the discharging interface, the charge/discharge control equipment comprising a charge/discharge circuit, a controller and a detection circuit; wherein, the charge/discharge circuit is connected with the several detachable batteries in the several battery compartments respectively;

the controller is connected with the charge/discharge circuit and the several detachable batteries; and the detection circuit is connected with the several detachable batteries and the controller for detecting voltage values of the several detachable batteries, and controlling at least some detachable batteries of the several detachable batteries to be connected with the charge/discharge circuit to run according to the voltage values; wherein, the at least some detachable batteries are all batteries among the several detachable batteries with voltage difference not exceeding a preset value.

13. The battery quick-change device according to claim 12, wherein the charge control equipment further comprises several MOS transistors connected with the several detachable batteries respectively, each of the several detachable batteries is connected with the charge/discharge circuit via a respective MOS transistor, and the charge/discharge circuit is configured to control a connection or disconnection of a respective detachable battery by controlling a switch of a respective MOS transistor.

14. The battery quick-change device according to claim 1, further comprising a display device for displaying a level of battery power.

15. The battery quick-change device according to claim 1, further comprising a heat radiation fin arranged on the power station housing.

16. The battery quick-change device according to claim 1, further comprising:

several plugs, each being embedded into the respective through hole of the several through holes.

17. The battery quick-change device according to claim 1, wherein each respective battery compartment of the several battery compartments is provided with two buffer springs, and the respective first connector is arranged between the two buffer springs.

* * * * *